United States Patent
Jian et al.

(10) Patent No.: US 12,182,382 B2
(45) Date of Patent: Dec. 31, 2024

(54) VIDEO INTERACTION METHOD AND APPARATUS, ELECTRONIC DEVICE, AND STORAGE MEDIUM

(71) Applicant: Beijing Zitiao Network Technology Co., Ltd., Beijing (CN)

(72) Inventors: Jingtong Jian, Beijing (CN); Jiayi Shi, Beijing (CN); Yuchen Wang, Beijing (CN); Licong Song, Beijing (CN); Yirui Cao, Beijing (CN); Qing Song, Beijing (CN); Liyue Ji, Beijing (CN); Shun Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/524,232

(22) Filed: Nov. 30, 2023

(65) Prior Publication Data

US 2024/0094875 A1 Mar. 21, 2024

Related U.S. Application Data

(63) Continuation of application No. PCT/CN2022/101056, filed on Jun. 24, 2022.

(30) Foreign Application Priority Data

Jul. 20, 2021 (CN) .......................... 202110820990.3

(51) Int. Cl.
  *G06F 17/00* (2019.01)
  *A63F 13/533* (2014.01)
  (Continued)

(52) U.S. Cl.
  CPC .......... *G06F 3/0483* (2013.01); *A63F 13/533* (2014.09); *A63F 13/61* (2014.09)

(58) Field of Classification Search
  CPC ........ G06F 3/0483; G06F 3/0484; G06F 9/48; A63F 13/533; A63F 13/61;
  (Continued)

(56) References Cited

U.S. PATENT DOCUMENTS

| 2002/0131511 A1* | 9/2002 | Zenoni | H04N 21/44016 |
| | | | 348/521 |
| 2007/0124699 A1* | 5/2007 | Michaels | G06F 3/0482 |
| | | | 715/837 |

(Continued)

FOREIGN PATENT DOCUMENTS

| CN | 103067747 A | 4/2013 |
| CN | 106921892 A | 7/2017 |

(Continued)

OTHER PUBLICATIONS

China National Intellectual Property Administration, Office Action and Search Report Issued in Application No. 202110820990.3, Jun. 16, 2022, 6 pages.

(Continued)

*Primary Examiner* — Jason T Edwards
(74) *Attorney, Agent, or Firm* — Alleman Hall & Tuttle LLP

(57) ABSTRACT

The present disclosure discloses a video interaction method and apparatus, an electronic device, and a storage medium. The video interaction method comprises: in response to a recommended video of a target object being played to a first time node, displaying an interactive window at a preset position on a video playback page and continuing playing the recommended video; receiving an object determination operation acting in the interactive window; displaying first object information of an object to be collected in the interactive window, wherein the object to be collected is related to the target object; receiving a collection operation (Continued)

for the object to be collected; and displaying a target page for a user to collect the object to be collected.

15 Claims, 9 Drawing Sheets

(51) Int. Cl.
*A63F 13/61* (2014.01)
*G06F 3/0483* (2013.01)

(58) Field of Classification Search
CPC ......... H04N 21/44222; H04N 21/4725; H04N 21/47815; H04N 21/8483
USPC ........................................................ 715/719
See application file for complete search history.

(56) References Cited

U.S. PATENT DOCUMENTS

| | | | |
|---|---|---|---|
| 2012/0084825 A1* | 4/2012 | Sharma | H04N 21/8166 725/109 |
| 2013/0088648 A1 | 4/2013 | Yoon et al. | |
| 2014/0282743 A1* | 9/2014 | Howard | H04N 21/8583 725/60 |
| 2016/0188671 A1* | 6/2016 | Gupta | H04L 51/52 707/722 |
| 2017/0329475 A1* | 11/2017 | Park | G06F 3/0482 |
| 2020/0162798 A1* | 5/2020 | Khan | G06F 3/0484 |
| 2020/0336804 A1 | 10/2020 | Cui et al. | |
| 2020/0387293 A1* | 12/2020 | We | G06F 3/04883 |
| 2022/0312065 A1 | 9/2022 | Han et al. | |
| 2023/0136808 A1 | 5/2023 | Yuan et al. | |
| 2024/0040199 A1 | 2/2024 | Shi et al. | |

FOREIGN PATENT DOCUMENTS

| | | |
|---|---|---|
| CN | 108769814 A | 11/2018 |
| CN | 111787415 A | 10/2020 |
| CN | 112087544 A | 12/2020 |
| CN | 112261459 A | 1/2021 |
| CN | 113014989 A | 6/2021 |
| CN | 113031842 A | 6/2021 |
| CN | 113110783 A | 7/2021 |
| CN | 113542853 A | 10/2021 |
| EP | 4084488 A1 | 11/2022 |
| JP | 2018205998 A | 12/2018 |

OTHER PUBLICATIONS

China National Intellectual Property Administration, Office Action and Search Report Issued in Application No. 202110820990.3, Nov. 7, 2022, 6 pages.
China National Intellectual Property Administration, Office Action and Search Report Issued in Application No. 202110820990.3, Mar. 18, 2023, 4 pages.
ISA China National Intellectual Property Administration, International Search Report and Written Opinion Issued in Application No. PCT/CN2022/101056, Sep. 15, 2022, WIPO, 13 pages.
European Patent Office, Extended European Search Report Issued in Application No. 22845083.9, Sep. 27, 2024, 10 pages.
Japan Patent Office, Office Action Issued in Application No. 2023-573634, Oct. 8, 2024, 6 pages.

* cited by examiner

VIDEO INTERACTION METHOD AND APPARATUS, ELECTRONIC DEVICE, AND STORAGE MEDIUM

CROSS-REFERENCE TO RELATED APPLICATIONS

The present disclosure is a U.S. National Stage Application under 35 U.S.C. § 371 of International Patent Application No. PCT/CN2022/101056, filed on Jun. 24, 2022, which is based on and claims priority of Chinese application for invention No. 202110820990.3, filed on Jul. 20, 2021, the disclosures of both of which are hereby incorporated into this disclosure by reference in its entirety.

TECHNICAL FIELD

This disclosure relates to the field of computer technology, especially to a video interaction method, a video interaction apparatus, an electronic device, and a storage medium.

BACKGROUND

A recommended video of a game can be pushed to a user. The recommended video can be used to direct the user to an interactive page for an interaction. For example, the user is directed to the interactive page to play a trial portion of the game, thereby stimulating the user to download the game.

SUMMARY

This disclosure provides a video interaction method and apparatus, an electronic device, and a storage medium.

The present disclosure provides a video interaction method, comprising:
 in response to a recommended video of a target object being played to a first time node, displaying an interactive window at a preset position on a video playback page and continuing playing the recommended video;
 receiving an object determination operation acting in the interactive window;
 displaying first object information of an object to be collected in the interactive window, wherein the object to be collected is related to the target object;
 receiving a collection operation for the object to be collected; and
 displaying a target page for a user to collect the object to be collected.

The present disclosure further provides a video interaction apparatus, comprising:
 a window display module configured to in response to a recommended video of a target object being played to a first time node, display an interactive window at a preset position on a video playback page and continue playing the recommended video;
 a determination operation receiving module configured to receive an object determination operation acting in the interactive window;
 a first object information display module configured to display first object information of an object to be collected in the interactive window, wherein the object to be collected is related to the target object;
 a collection operation receiving module configured to receive a collection operation for the object to be collected; and
 a target page display module configured to display a target page for a user to collect the object to be collected.

The present disclosure further provides an electronic device, comprising:
 one or more processors;
 a memory for storing at least one program, which when executed by the at least one processor, causes the at least one processor to implement the above video interaction method.

The present disclosure further provides a non-transitory computer storage medium stored thereon a computer program which when executed by a processor, causes the processor to implement the video interaction method described above.

DETAILED DESCRIPTION

Figure 1:
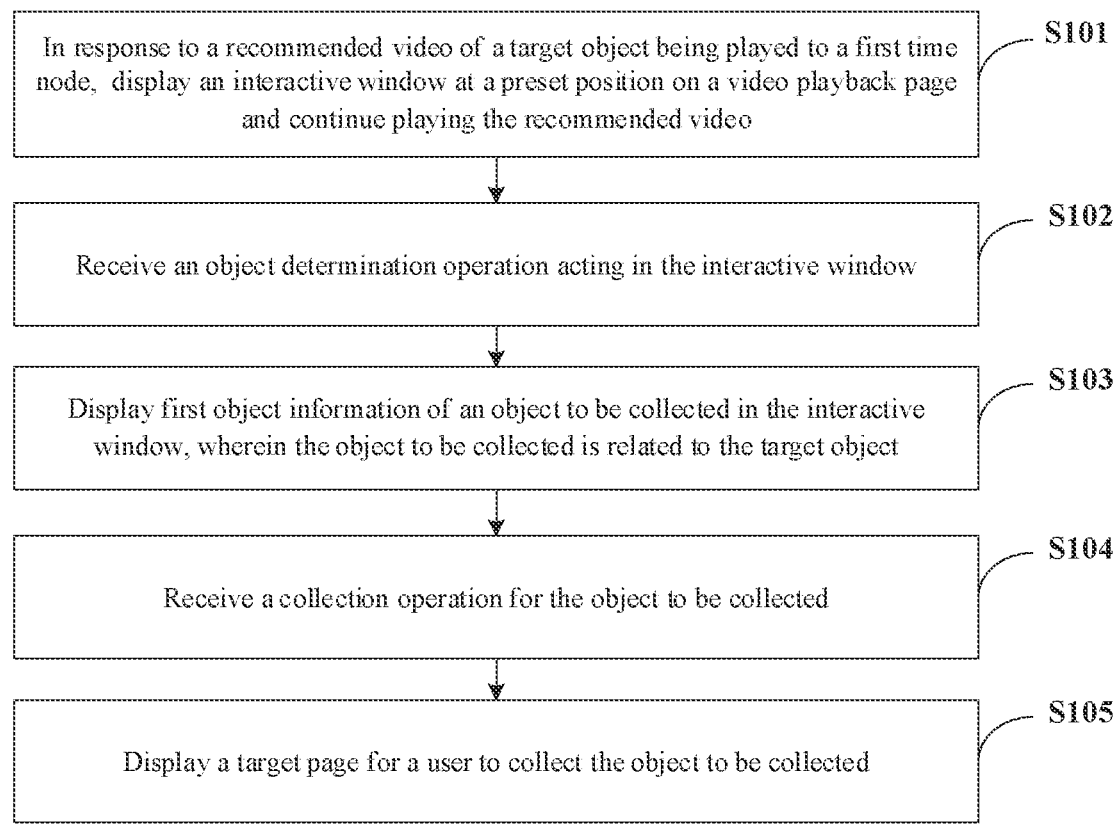
FIG. 1 is a flowchart of a video interaction method provided in some embodiments of the present disclosure.

Below, embodiments of this disclosure will be described with reference to the drawings. Although some embodiments of the present disclosure are shown in the drawings, it should be understood that the present disclosure can be implemented in various forms, and these embodiments are provided for the purpose of understanding the present disclosure. The accompanying drawings and embodiments disclosed herein are for illustrative purposes only.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

The inventors have found that by directing user to the interactive page, complex operations are required for the interaction in the interactive page which can degrade the user's experience, resulting in an inability of the recommended video to achieve a good recommendation result. Therefore, a video interaction method is provided in some embodiments of the present disclosure.

FIG. 1 is a flowchart of a video interaction method provided in some embodiments of the present disclosure. This method can be performed by a video interaction apparatus, which can be implemented in the form of software and/or hardware. The apparatus can be provided in an electronic device, such as a mobile phone or a tablet. The video interaction method provided in the embodiments is applicable to scenarios of interacting with a recommended video of a game or a product. As shown in FIG. 1, the video interaction method provided in the embodiments may comprise the following steps.

In S101, in response to a recommended video of a target object being played to a first time node, an interactive window is displayed at a preset position on a video playback page and the recommended video is continued playing.

The target object can be an object to be recommended, such as an item (comprising a real and/or a virtual item) or an application software (such as a game software or a software of another type) which is recommended to a user to use. Correspondingly, the recommended video can be a video that recommends the user to use the target object, such as an advertising video of the target object. The interactive window can be considered as a window for the user to interact with. The first time node and the preset position for displaying the interactive window can be specified according to needs. For example, the preset position can be close to a side of the video playback page, i.e., the interactive window can be displayed on one side of the video playback page, such as on a bottom side of the video playback page, to reduce an occlusion of video images that the user is more concerned about.

In the embodiments, when playing the recommended video of the target object, the interactive window can be directly displayed on a playback page of the recommended video (i.e. video playback page), allowing the user to interact directly in the interactive window, such as receiving a reward, playing a game, or trying out an application software, and so on. There is no need to stop watching the recommended video or switch to another page, so the user can interact while watching the recommended video. In this way, a user loss due to page switching can be reduced, the user's experience can be improved, and a recommendation effect of the recommended video can be increased.

Figure 2:
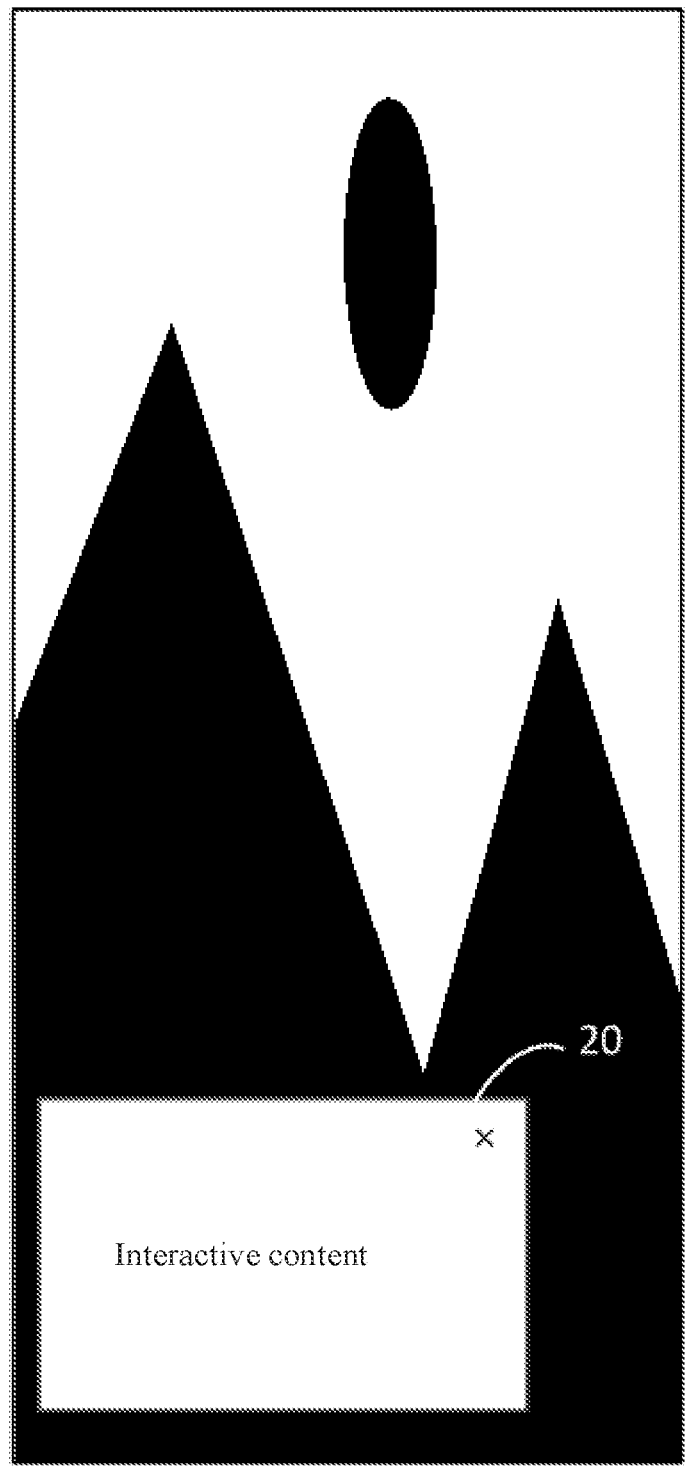
FIG. 2 is a schematic diagram of an interactive window provided in some embodiments of the present disclosure.

For example, an electronic device may play the recommended video of the target object on the video playback page based on a video playback operation or a video switching operation of the user, and periodically determine whether the recommended video is played to the first time node. If the recommended video is played to the first time node, an interactive window 20 is displayed at the preset position on the video playback page, as shown in FIG. 2. Some corresponding interactive content (not shown in FIG. 2) is displayed in the interactive window 20, such as game screens and/or interaction controls of a corresponding interactive game, while the recommended video is played continuously. If the playback of the recommended video has not reached the first time node, the recommended video is played continuously. The embodiments do not limit a display method of the interactive window 20. For example, the interactive window 20 may slide out from one side of the video playback page, or may be displayed gradually at the preset position in a fade-in manner, or may be displayed directly at the preset position.

In S102, an object determination operation acting in the interactive window is received.

The object determination operation can be considered as an operation to determine an object to be collected, that is, an operation for an interaction performed by the user in the interactive window to obtain the object to be collected, such as an operation to trigger a card displayed in the interactive window or an operation to trigger a box displayed in the interactive window.

The electronic device displays corresponding interactive content in the interactive window. Thus, when the user wants to interact, he or she can trigger a corresponding interactive area or an interactive control in the interactive content displayed in the interactive window. Therefore, when the electronic device detects that a trigger operation of the user to trigger the corresponding interactive area or the interactive control in the interactive window to select the object to be collected or instruct the electronic device to display the object to be collected, it can be determined that the object determination operation acting in the interactive window is received.

In S103, first object information of an object to be collected is displayed in the interactive window, wherein the object to be collected is related to the target object.

The object to be collected can be an object that is available for collection and is determined based on an interaction of the user. The object to be collected can be a real or virtual item related to the target object. For example, if the target object is an article (such as clothing), the object to be collected can be another item (such as an accessory or a coupon) related to the article. If the target object is an application software (such as a game software), the object to be collected can be a virtual item (such as a prop or a skin) used within the application software. The first object information can be object information of the object to be collected, such as an image, a name, a quantity, and/or a redemption code of the object to be collected.

Figure 3:
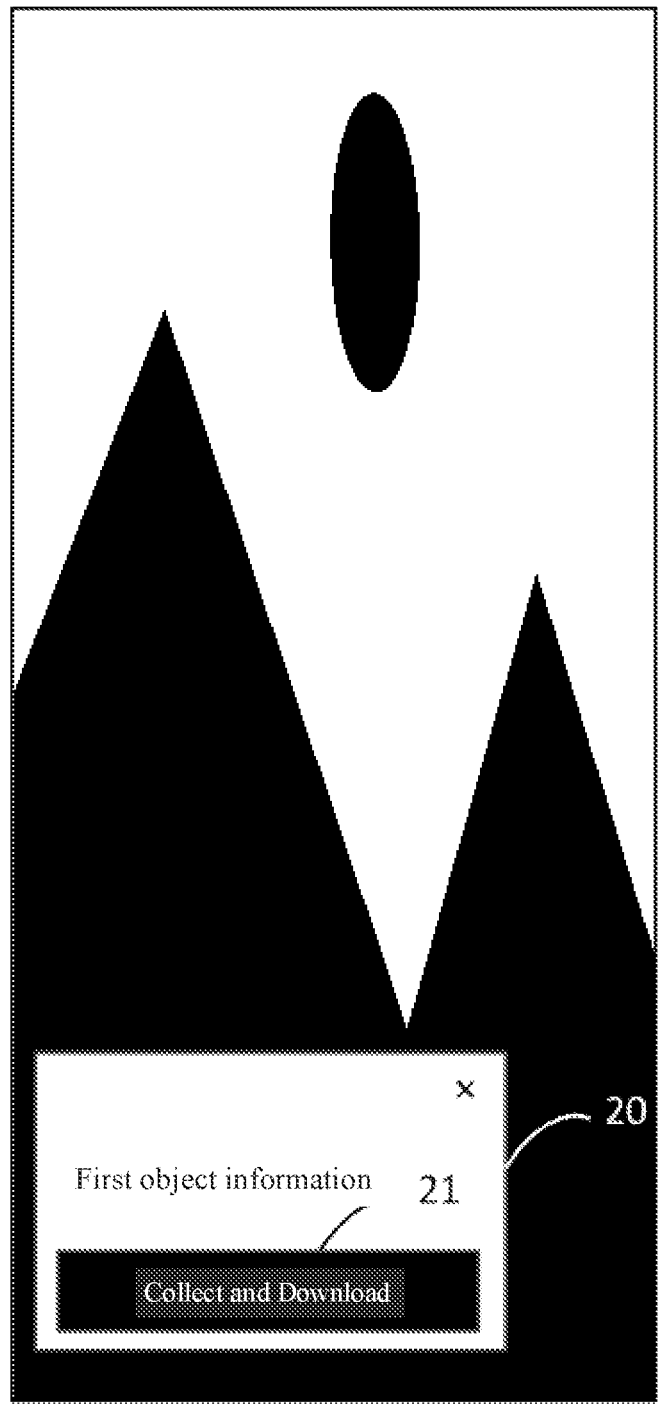
FIG. 3 is a schematic diagram of a first object information display provided in some embodiments of the present disclosure.

For example, when the electronic device receives the object determination operation, it can determine the object to be collected based on the interactive content displayed in the interactive window and in conjunction with the received object determination operation, for example, a trigger position, a trigger force and/or a trigger duration of the object determination operation, and display the object information of the object to be collected in the interactive window. Current display content in the interactive window 20 is changed from the interactive content to the first object information of the object to be collected and a collect control 21, as shown in FIG. 3 (an example is shown in which the target object is an application not installed in the electronic device).

Taking a turntable game as an example, the electronic device can display a turntable having multiple regions and a spin control, and display object information of an object that can be drawn by the user corresponding to each of the multiple regions in the interactive window. So, if the user wants to draw the object to be collected, he/she can trigger the spin control. Accordingly, when the electronic device detects that the spin control is triggered by the user, it can make the turntable displayed in the interactive window spin. For example, an animation is displayed that shows the turntable spinning at a speed that is gradually reduced according to a certain rule and then stops. When the turntable stops, an object corresponding to the object information displayed in a region pointed to by a pointer corresponding to the turntable can be used as the object to be collected. The display of the turntable can be terminated and the first object information of the object to be collected can be displayed in the interactive window.

In S104, a collection operation for the object to be collected is received.

The collection operation can be a trigger operation for the object to be collected displayed in the interactive window, such as an operation that triggers a collect control in the interactive window.

For example, as shown in FIG. 3, the electronic device displays the object information of the object to be collected and a collect control 21 in the interactive window 20. Thus, the user can view the object information of the object to be collected displayed in the interactive window 20, and trigger the collect control 21 displayed in the interactive window 20 if he or she wants to collect the object to be collected. Accordingly, when the electronic device detects that the collect control 21 in the interactive window 20 is triggered by the user, it determines that the collection operation for the object to be collected displayed in the interactive window 20 is received.

In S105, a target page is displayed for a user to collect the object to be collected.

The target page can be a page for the user to collect the object to be collected, such as a page for the user to purchase, activate, download, or use the target object to collect the object to be collected. For example, if the target object is an article, the target page can be a details page of the target object; if the target object is an application, the target page can be a details page of the target object or a preset page present in the target object, and so on.

When the electronic device receives the collection operation for the object to be collected, it can switch a page currently displayed on the electronic device from the video playback page to the target page which is preset for the user to collect the object to be collected. For example, the electronic device may distribute the object to be collected to a login account of the user, display relevant information of the object to be collected on the target page for the user to collect the object to be collected, or distribute the object to be collected to the login account of the user based on a redemption code of the object to be collected entered by the user.

In the embodiments, the target page may be a page of a current application or a page of another application (such as a target application). Accordingly, if the target page is the page of the current application, a current page can be directly switched from the video playback page to the target page; if the target page is the page of the other application, a target page display request can be sent to the other application to request the other application to display the target page. Thus, the other application can display the target page when it receives the target page display request. For example, the displaying the target page comprises: switching the video playback page to the target page; or sending a target page display request to a target application, wherein the target page display request is used to request the target application to display the target page.

In the video interaction method provided in the embodiments, in response to the recommended video of the target object being played to the first time node, the interactive window is displayed at the preset position on the video playback page and the recommended video is continued playing simultaneously; the object determination operation acting in the interactive window is received, the first object information of the object to be collected that is related to the target object is displayed in the interactive window; and the collection operation for the object to be collected is received, the target page is displayed for the user to collect the object to be collected. According to the above technical solution of the embodiments, the interactive window is displayed for the user to interact and the recommended video is continued playing without a need for page switching or interrupting the playback of the recommended video. This can reduce operations required for interaction and improve the user's experience of viewing the recommended video and interaction.

Figure 4:
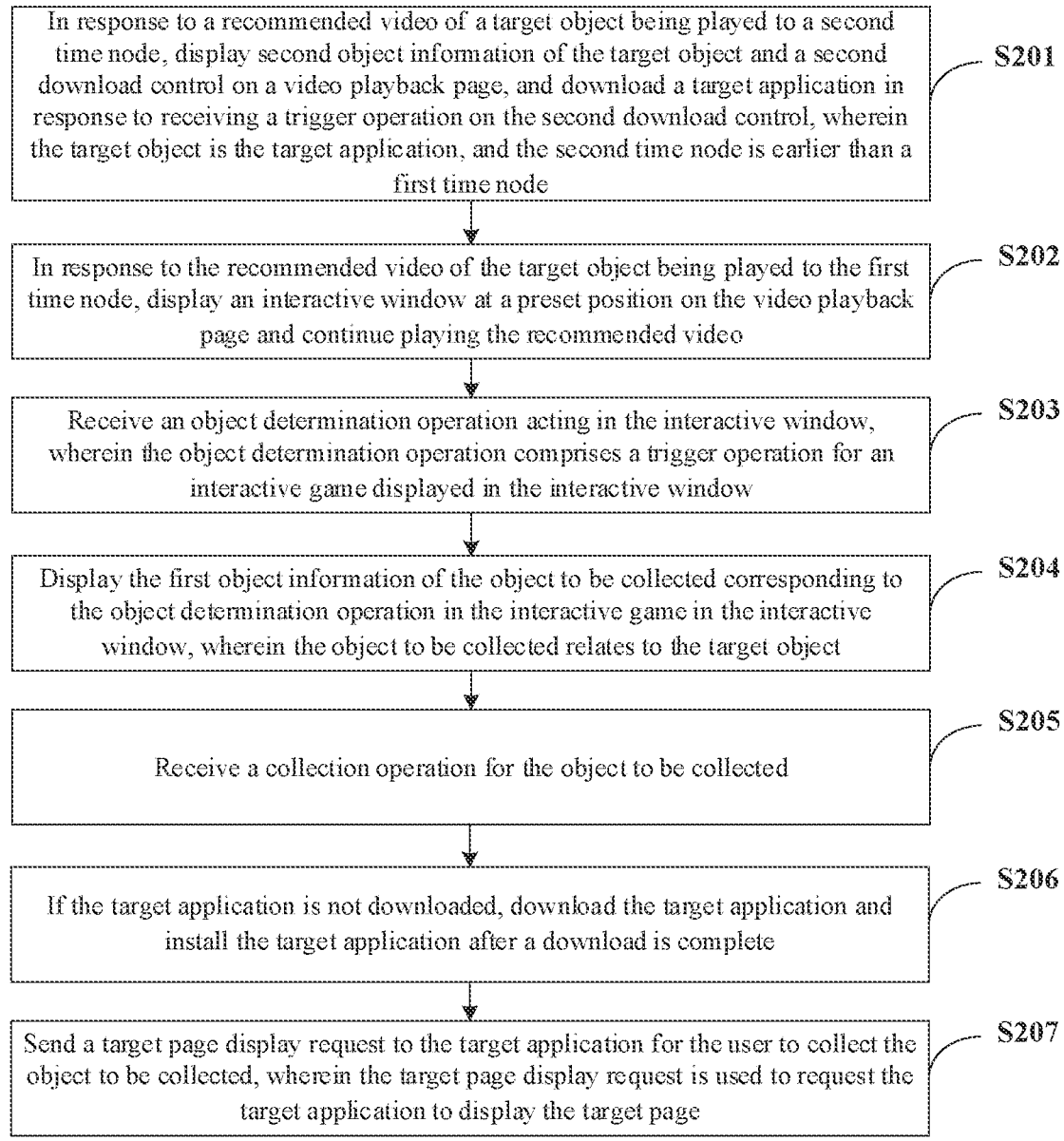
FIG. 4 is a flowchart of another video interaction method provided in some embodiments of the present disclosure.

FIG. 4 is a flowchart of another video interaction method provided in some embodiments of the present disclosure. The schemes in the embodiments can be combined with one or more optional schemes in the above embodiments. Optionally, the target object is a target application, and before sending a target page display request to the target application, the method further comprises: in a case where the target application is not downloaded, downloading the target application and installing the target application after a download is complete.

Optionally, the video interaction method provided by the embodiments further comprises: in response to the recommended video of the target object being played to a second time node, displaying second object information of the target object and a second download control on the video playback page, to download the target application in response to receiving a trigger operation on the second download control, wherein the second time node is earlier than the first time node.

Optionally, the object determination operation comprises a trigger operation for an interactive game displayed in the interactive window, and the displaying first object information of an object to be collected in the interactive window comprises: displaying, in the interactive window, the first object information of the object to be collected corresponding to the object determination operation in the interactive game.

Accordingly, as shown in FIG. 4, the video interaction method provided in the embodiments may comprise the following steps.

In S201, in response to a recommended video of a target object being played to a second time node, second object information of the target object and a second download control are displayed on a video playback page, and a target application is downloaded in response to receiving a trigger operation on the second download control, wherein the target object is the target application, and the second time node is earlier than a first time node.

The second object information can be the object information of the target object, which can comprise information such as a name and an image of the target object. The second download control can be a control displayed on the video playback page that the user can trigger to download the target object (i.e., the target application).

Figure 5:
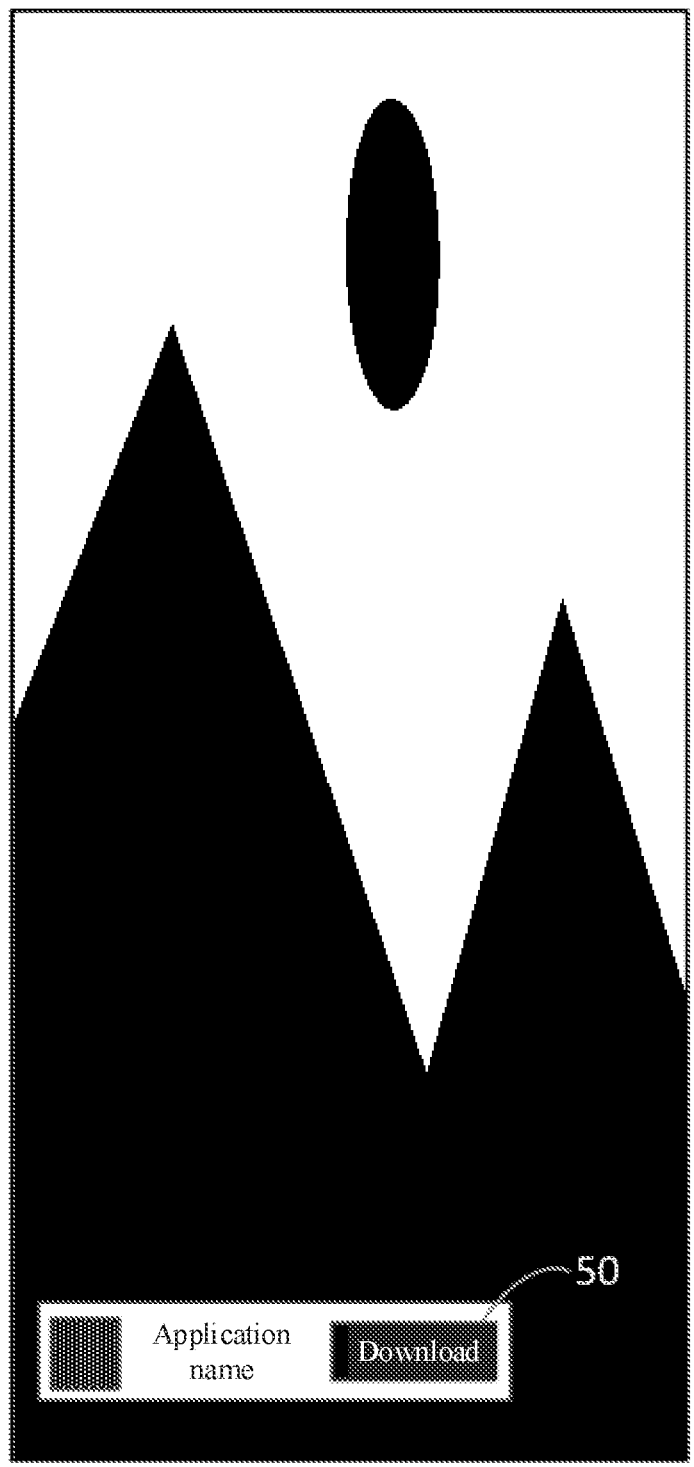
FIG. 5 is a schematic diagram of a second object information display provided in some embodiments of the present disclosure.

In the embodiments, if the target object is the target application that has not been installed in the electronic device, and in response to the recommended video of the target application being played to the second time node, the second object information of the target object and the second download control 50 can be displayed on the video playback page, as shown in FIG. 5. Thus, if the user wants to download the target application, he/she can trigger the second download control 50. Accordingly, when the current application detects that the second download control 50 is triggered by the user, the target application can be downloaded. For example, an installation package of the target application can be obtained from a server corresponding to the current application or a server corresponding to the target application; or a details page of the target application can be switched to and the installation package of the target application can be obtained in response to detecting that the user triggers a download control in the details page. After the download of the target application is complete, the current application can automatically request the electronic device which the current application installed in to install the target application, or display or request the electronic device to display an installation page of the target application, and display installation prompt information on the installation page to prompt the user to install the target application.

In S202, in response to the recommended video of the target object being played to the first time node, an interactive window is displayed at a preset position on the video playback page and the recommended video is continued playing.

In S203, an object determination operation acting in the interactive window is received, wherein the object determination operation comprises a trigger operation for an interactive game displayed in the interactive window.

In S204, the first object information of the object to be collected corresponding to the object determination operation in the interactive game is displayed in the interactive window, wherein the object to be collected relates to the target object.

The interactive game can be a game displayed in the interactive window that the user can interact with to get an object to be collected. The interactive game can be set according to needs. Fox example, it can be a flip or draw card game, an open box game, a turntable game, or a prize grabber game.

In the embodiments, a preset interactive game can be displayed in the interactive window. The object to be collected can be determined based on the user's interactive operation (such as an object determination operation) in the interactive game, and the first object information of the object to be collected can be displayed in the interactive window. For example, when the interactive game is a flip card or draw card game, an object corresponding to a card triggered by the user can be determined as the object to be collected; when the interactive game is an open box game, an object corresponding to a box triggered by the user can be determined as the object to be collected; when the interactive game is a turntable game, a turntable can spin based on the user's interactive operation, and an object pointed by a pointer when the turntable stops can be determined as the object to be collected; when the interactive game is a prize grabber game, an object grabbed by the user through the interactive operation can be determined as the object to be collected.

In some embodiments, the object to be collected is displayed in a form of a card, and the displaying, in the interactive window, the first object information of the object to be collected corresponding to the object determination operation in the interactive game comprises: flipping a target card corresponding to the object determination operation in the interactive window, and displaying the first object information of the object to be collected corresponding to the target card in the interactive window.

The target card can be considered as a card on which the object determination operation is performed, such as a card displayed at a trigger position of the object determination operation.

Figure 6:
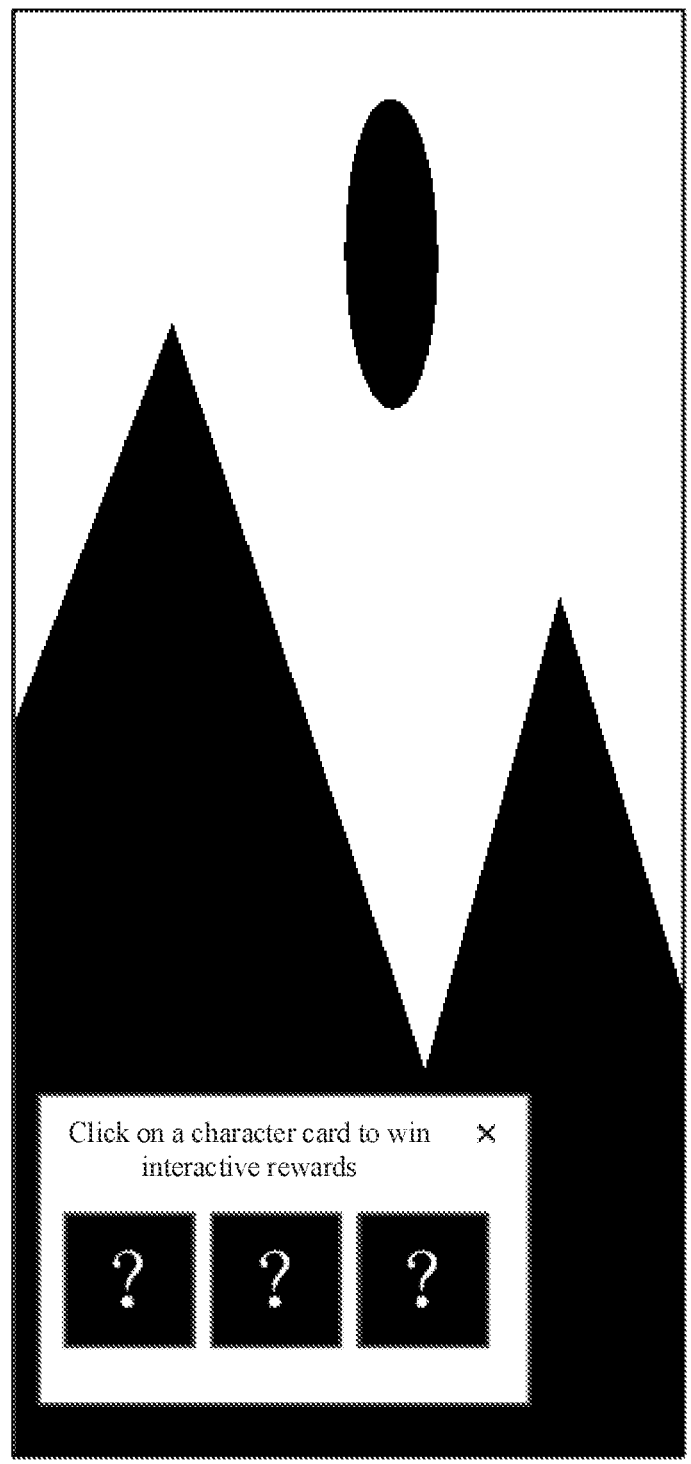
FIG. 6 is a schematic diagram of a game screen of an interactive game provided in some embodiments of the present disclosure.

For example, in response to the recommended video of the target object being played to the first time node, the electronic device displays the interactive window on the video playback page and displays a preset number of objects in the form of cards in the interactive window, as shown in FIG. 6. Thus, when the user want to determine the object to be collected, he/she can trigger (e.g., click on) a card displayed in the interactive window. Accordingly, when the electronic device detects that the card displayed in the interactive window is triggered by the user, the electronic device can determine that the object determination operation is received and, in response to the object determination operation, display an animation for flipping the card affected by the object determination operation in the interactive window. After the card flipping animation is completed, the electronic device can display a front image of the card comprising an image and/or a name of the object to be collected corresponding to the card, and replace the card displayed in the interactive window with object information of the object to be collected, that is, terminate the display of the card and display the object information of the object to be collected in the interactive window.

In some other embodiments, the object to be collected is displayed in a form of a box, and the displaying, in the interactive window, the first object information of the object to be collected corresponding to the object determination operation in the interactive game comprises: displaying an animation of opening a target box corresponding to the object determination operation in the interactive window, and displaying the first object information of the object to be collected corresponding to the target box in the interactive window in response to the animation being finished.

The target box can be considered as a box on which the object determination operation is performed, such as a box displayed at a trigger position of the object determination operation.

Figure 7:
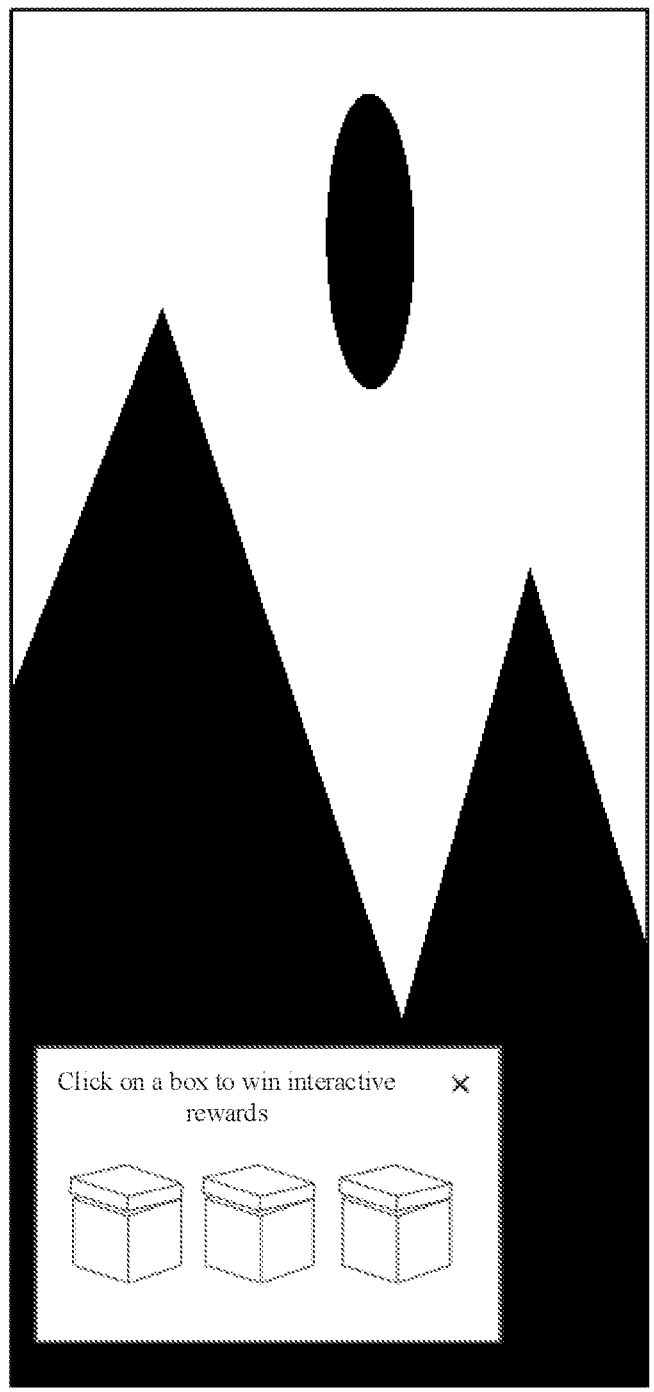
FIG. 7 is a schematic diagram of a game screen of another interactive game provided in some embodiments of the present disclosure.

For example, in response to the recommended video of the target object being played to the first time node, the electronic device displays the interactive window on the video playback page and displays a preset number of objects in the form of boxes in the interactive window. For example, a preset number of boxes are displayed in the interactive window, as shown in FIG. 7. Thus, when a user want to determine the object to be collected, he/she can trigger (e.g., click on) a box displayed in the interactive window. Accordingly, when the electronic device detects that a box displayed in the interactive window is triggered by a user, the electronic device can determine that the object determination operation is received and, in response to the object determination operation, display an animation of opening the box affected by the object determination operation in the interactive window. After the animation is completed, the electronic device can display object information of the object to be collected corresponding to the box. For example, the display of the box is terminated and the object information of the object to be collected is displayed in the interactive window.

In S205, a collection operation for the object to be collected is received.

In S206, if the target application is not downloaded, the target application is downloaded and installed after a download is complete.

In the embodiments, if the target page to be displayed is a page of a third-party application (i.e., the target application), after receiving the collection operation for the target object, it can be determined whether the target application has been installed in the electronic device. If the target application has been installed in the electronic device, subsequent operations can be directly executed; and if the target application has not been installed in the electronic device, the target application can be downloaded and installed, and when it is detected that an installation of the target application is complete, the subsequent operations can be executed.

The method of downloading and installing the target application can be flexibly configured. For example, an installation package of the target application can be obtained from a server corresponding to the current application or a server corresponding to the target application; or a details page of the target application can be switched to and the installation package of the target application can be obtained in response to detecting that the user triggers a download control in the details page. After the download of the target application is complete, the current application can automatically request the electronic device which the current application installed in to install the target application, or display or request the electronic device to display an installation page of the target application, and display installation prompt information on the installation page to prompt the user to install the target application.

Figure 8:
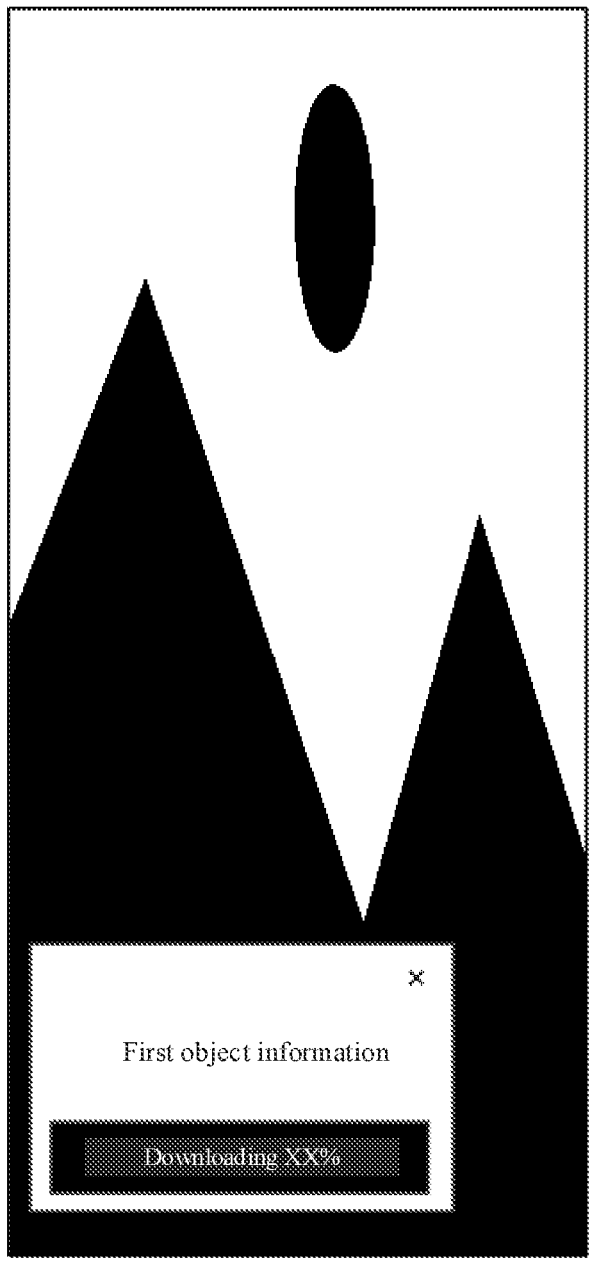
FIG. 8 is a schematic diagram of a method for displaying download progress provided in some embodiments of the present disclosure.

In the embodiments, the electronic device can download the target application in a background and continue playing the video on the video playback page while downloading the target application. A download progress of the target application can be displayed on the video playback page, as shown in FIG. 8. Alternatively, the electronic device can download the target application and then switch a current page from the video playback page to a details page of the target application; or switch the current page from the video playback page to a details page of the target application, and download the target application in response to detecting that the user trigger a download control displayed in the details page. In this case, downloading the target application may comprise: downloading the target application and displaying a download progress of the target application in the interactive window; or switching the current page from the video playback page to a details page of the target application, and downloading the target application in response to receiving a trigger operation on a first download control in the details page. The first download control can be considered as a control displayed in the details page of the target application that the user can trigger to download the target application.

In S207, a target page display request is sent to the target application for the user to collect the object to be collected, wherein the target page display request is used to request the target application to display the target page.

In the video interaction method provided in the embodiments, when the recommended video of the target application software is played to the second time node, the information of the target application and a download control corresponding to the target application are displayed; when the recommended video of the target application is played to the first time node, the interactive window is displayed, and the object to be collected is determined based on the object determination operation performed by the user in the interactive window. When the collection operation for the object to be collected is received, if the target application is not downloaded, the target application is downloaded and is requested to display the target page for the user to collect the object to be collected. By adopting the above technical solution, the embodiments can reduce the operations required for interaction and improve the recommendation effect of the recommended video.

Figure 9:
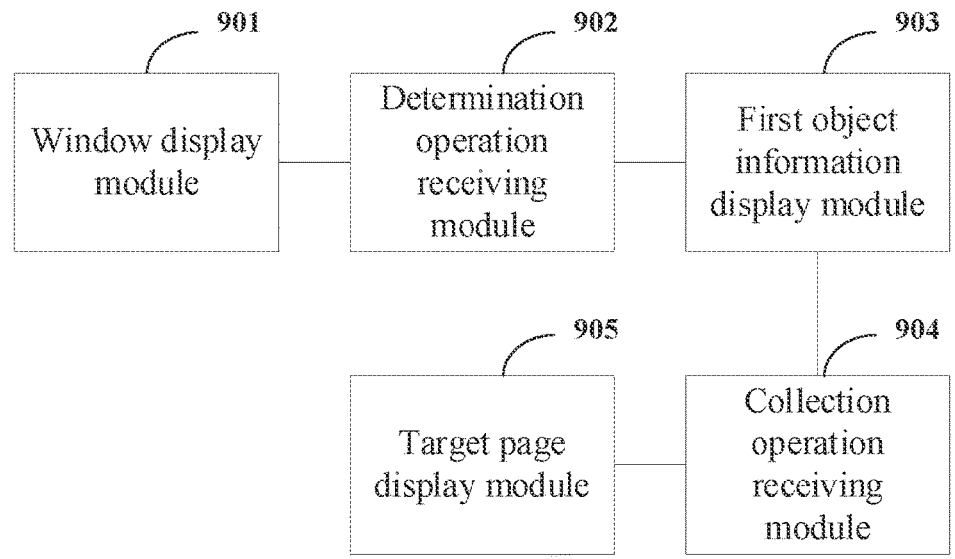
FIG. 9 is a schematic structural diagram of a video interaction apparatus provided in some embodiments of the present disclosure.

FIG. 9 is a schematic structural diagram of a video interaction apparatus provided in some embodiments of the present disclosure. This apparatus can be implemented in a form of software and/or hardware, and can be provided in an electronic device. For example, the apparatus can be provided in a mobile phone or a tablet to enable interaction by performing a video interaction method. As shown in FIG. 9, the video interaction apparatus provided in the embodiments may comprise: a window display module 901, a determination operation receiving module 902, a first object information display module 903, a collection operation receiving module 904 and a target page display module 905. The window display module 901 is configured to in response to a recommended video of a target object being played to a first time node, display an interactive window at a preset position on a video playback page and continue playing the recommended video; the determination operation receiving module 902 is configured to receive an object determination operation acting in the interactive window; the first object information display module 903 is configured to display first object information of an object to be collected in the interactive window, wherein the object to be collected is related to the target object; the collection operation receiving module 904 is configured to receive a collection operation for the object to be collected; the target page display module 905 is configured to display a target page for a user to collect the object to be collected.

In the video interaction apparatus provided in the embodiments, when the recommended video of the target object is played to the first time node, the interactive window is displayed at the preset position on the video playback page and the recommended video is continued playing by the window display module 901; the object determination operation acting in the interactive window is received by the determination operation receiving module 902, and the first object information of the object to be collected related to the target object is displayed in the interactive window by the first object information display module 903; the collection operation for the object to be collected is received by the collection operation receiving module 904; the target page for the user to collect the object to be collected is displayed by the target page display module 905. According to the above technical solution of the embodiments, the interactive window is displayed for the user to interact while playing the recommended video continuously without the need for page switching or interrupting the playback of the recommended video. This can reduce the operations required for interaction and improve the user's video viewing and interaction experience.

In the above scheme, the target page display module 905 may be configured to switch from the video playback page to the target page; or send a target page display request to a target application, wherein the target page display request is used to request the target application to display the target page.

In the above scheme, the target object can be a target application, and the video interaction apparatus provided by the embodiments may further comprise: a software download module configured to before sending the target page display request to the target application, download the target application and installing the target application after a download is complete, in a case where the target application is not installed.

In the above scheme, the software download module may be configured to download the target application and display a download progress of the target application in the interactive window; or switch from the video playback page to a details page of the target application, and download the target application in response to receiving a trigger operation on a first download control in the details page.

The video interaction apparatus provided by the embodiments may further comprise: a second object information display module configured to in response to the recommended video of the target object being played to a second time node, display second object information of the target object and a second download control on the video playback page, to download the target application in response to receiving a trigger operation on the second download control, wherein the second time node is earlier than the first time node.

In the above scheme, the object determination operation may comprise a trigger operation for an interactive game displayed in the interactive window, and the first object information display module 903 may be configured to display, in the interactive window, the first object information of the object to be collected corresponding to the object determination operation in the interactive game.

In the above scheme, the object to be collected is displayed in a form of a card, and the first object information display module 903 may be configured to flip a target card corresponding to the object determination operation in the interactive window, and display the first object information of the object to be collected corresponding to the target card in the interactive window.

In the above scheme, the object to be collected is displayed in a form of a box, and the first object information display module 903 may be configured to display an animation of opening a target box corresponding to the object determination operation in the interactive window, and display the first object information of the object to be collected corresponding to the target box in the interactive window in response to the animation being finished.

The video interaction apparatus provided in the embodiments of the present disclosure can execute the video interaction method provided in any embodiment of the present disclosure, and has corresponding functional modules to implement the method and achieve the beneficial effect of the present disclosure. For technical details not described in detail in this embodiment, reference can be made to the video interaction method provided in any embodiment of the present disclosure.

Figure 10:
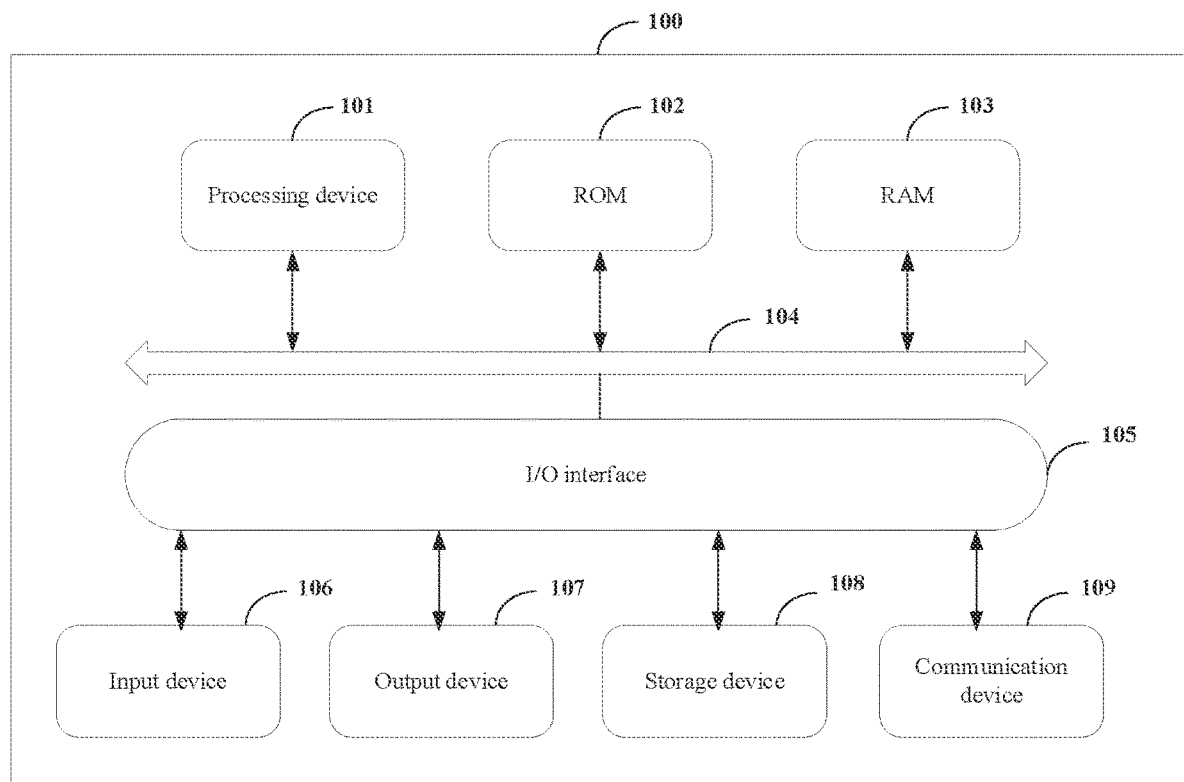
FIG. 10 is a schematic structural diagram of an electronic device provided in some embodiments of the present disclosure.

Referring now to FIG. 10, a structural diagram of an electronic device 100 (such as a terminal device) suitable for implementing the embodiments of the present disclosure is shown. The terminal device 100 of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device 100 shown in FIG. 10 is merely an example and should not impose any limitation on the function and scope of the embodiment of the present disclosure.

As shown in FIG. 10, the electronic device 100 may comprise a processing device (e.g., a central processing unit, a graphics processor) 101, which may perform various appropriate actions and processes according to a program stored in Read Only Memory (ROM) 102 or a program loaded from storage device 108 into Random Access Memory (RAM) 103. In RAM 103, various programs and data required for the operation of the electronic device 100 are also stored. The processing device 101, ROM 102, and RAM 103 are connected to each other through a bus 104. Input/Output (I/O) interface 105 is also connected to bus 104.

Generally, the following devices can be connected to the I/O interface 105: input devices 106 comprising, for example, a touch screen, a touch pad, a keyboard, a mouse, a camera, a microphone, an accelerometer, a gyroscope, etc.; output devices 107 comprising a liquid crystal display (LCD), a speaker, a vibrator, etc.; a storage device 108 such as a magnetic tape, a hard disk, etc.; and a communication device 109. The communication device 109 enables the electronic device 100 to communicate in a wireless or wired manner with other devices to exchange data. Although FIG. 10 shows the electronic device 100 with various components, it should be understood that it is not required to implement or have all of these components. Alternatively, more or fewer components can be implemented or provided.

According to some embodiments of the present disclosure, the processes described above with reference to the flowchart can be implemented as a computer software program. For example, some embodiments of the present disclosure comprises a computer program product, which comprises a computer program carried on a non-transitory computer readable medium, and containing program code for executing the method shown in the flowchart. In such some embodiments, the computer program may be downloaded and installed from the network through the communication device 109, or installed from the storage device 108, or from the ROM 102. When the computer program is executed by the processing device 101, the above functions defined in the method of the embodiment of the present disclosure are performed.

The computer readable medium in the present disclosure may be a computer readable signal medium or a computer readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM) or flash memory (FLASH), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wires, optical cables, RF (Radio Frequency), etc., or any suitable combination of the above.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a Local Area Network ("LAN"), a Wide Area Network ("WAN"), an Internet (e.g., the Internet), and an end-to-end network (e.g., an ad hoc end-to-end network), as well as any currently known or future developed network.

The above computer readable medium may be comprised in the electronic device described above; or it may exist alone without being assembled into the electronic device.

The computer readable medium carries one or more programs, which when executed by the electronic device, cause the electronic device to: in response to a recommended video of a target object being played to a first time node, display an interactive window at a preset position on a video playback page and continuing playing the recommended video; receive an object determination operation acting in the interactive window; display first object information of an object to be collected in the interactive window, wherein the object to be collected is related to the target object; receive a collection operation for the object to be collected; display a target page for a user to collect the object to be collected.

The computer program code for executing operations of the present disclosure may be complied by any combination of one or more program design languages, the program design languages comprising object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the drawings. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of modules do not constitute a limitation on the modules themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), and the like.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, Example 1 provides a video interaction method, comprising:

in response to a recommended video of a target object being played to a first time node, displaying an interactive window at a preset position on a video playback page and continuing playing the recommended video;

receiving an object determination operation acting in the interactive window;

displaying first object information of an object to be collected in the interactive window, wherein the object to be collected is related to the target object;

receiving a collection operation for the object to be collected; and displaying a target page for a user to collect the object to be collected.

According to one or more embodiments of the present disclosure, Example 2 provides the method according to Example 1, wherein the displaying the target page comprises:

switching from the video playback page to the target page; or sending a target page display request to a target application, wherein the target page display request is used to request the target application to display the target page used to request the target application to display the target page.

According to one or more embodiments of the present disclosure, Example 3 provides the method according to Example 2, wherein the target object is the target application and the method further comprises: before sending the target page display request to the target application:

downloading the target application and installing the target application after a download is complete, in a case where the target application is not installed.

According to one or more embodiments of the present disclosure, Example 4 provides the method according to Example 3, wherein the downloading the target application comprises:

downloading the target application and displaying a download progress of the target application in the interactive window; or switching from the video playback page to a details page of the target application, and downloading the target application in response to receiving a trigger operation on a first download control in the details page.

According to one or more embodiments of the present disclosure, Example 5 provides the method according to Example 3, further comprising: in response to the recommended video of the target object being played to a second time node, displaying second object information of the target object and a second download control on the video playback page, to download the target application in response to receiving a trigger operation on the second download control, wherein the second time node is earlier than the first time node.

According to one or more embodiments of the present disclosure, Example 6 provides the method according to any one of Examples 1 to 5, wherein the object determination operation comprises a trigger operation for an interactive game displayed in the interactive window, and the displaying first object information of an object to be collected in the interactive window comprises:

displaying, in the interactive window, the first object information of the object to be collected corresponding to the object determination operation in the interactive game.

According to one or more embodiments of the present disclosure, Example 7 provides the method according to Example 6, wherein the object to be collected is displayed in a form of a card, and the displaying, in the interactive window, the first object information of the object to be collected corresponding to the object determination operation in the interactive game comprises:

flipping a target card corresponding to the object determination operation in the interactive window, and displaying the first object information of the object to be collected corresponding to the target card in the interactive window.

According to one or more embodiments of the present disclosure, Example 8 provides the method according to Example 6, the object to be collected is displayed in a form of a box, and the displaying, in the interactive window, the first object information of the object to be collected corresponding to the object determination operation in the interactive game comprises:

displaying an animation of opening a target box corresponding to the object determination operation in the interactive window, and displaying the first object information of the object to be collected corresponding to the target box in the interactive window in response to the animation being finished.

According to one or more embodiments of the present disclosure, Example 9 provides a video interaction apparatus, comprising:

a window display module configured to in response to a recommended video of a target object being played to a first time node, display an interactive window at a preset position on a video playback page and continue playing the recommended video;

a determination operation receiving module configured to receive an object determination operation acting in the interactive window;

a first object information display module configured to display first object information of an object to be collected in the interactive window, wherein the object to be collected is related to the target object;

a collection operation receiving module configured to receive a collection operation for the object to be collected; and a target page display module configured to display a target page for a user to collect the object to be collected.

According to one or more embodiments of the present disclosure, Example 10 provides an electronic device, comprising:

one or more processors;

a memory for storing one or more programs, which when executed by the one or more processors, cause the one or more processors to implement the video interaction method according to any one of Examples 1 to 8.

According to one or more embodiments of the present disclosure, Example 11 provides a computer-readable medium stored thereon a computer program, which when executed by a processor, cause the processor to perform the video interaction method of any one of Examples 1 to 8.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

What is claimed is:

1. A video interaction method, comprising:

in response to a video of a target object being played to a first time node, displaying an interactive window at a preset position on a video playback page and continuing playing the video, wherein an interactive game is displayed in the interactive window, and the target object is a target application;

receiving an object determination operation acting in the interactive window, wherein the object determination operation comprises an interactive operation of a user in the interactive game;

displaying first object information of an object to be collected corresponding to the object determination operation in the interactive game in the interactive window, wherein the object to be collected is related to the target object;

receiving a collection operation in the interactive window for the object to be collected;

sending a target page display request to the target application, wherein the target page display request is used to request the target application to display a target page; and displaying the target page for a user to collect the object to be collected.

2. The video interaction method according to claim 1, further comprising, before sending the target page display request to the target application:

downloading the target application and installing the target application after a download is complete, in a case where the target application is not installed.

3. The video interaction method according to claim 2, wherein the downloading the target application comprises:

downloading the target application and displaying a download progress of the target application in the interactive window; or switching from the video playback page to a details page of the target application, and downloading the target application in response to receiving a trigger operation on a first download control in the details page.

4. The video interaction method according to claim 2, further comprising:

in response to the video of the target object being played to a second time node, displaying second object information of the target object and a second download control on the video playback page, to download the target application in response to receiving a trigger operation on the second download control, wherein the second time node is earlier than the first time node.

5. The video interaction method according to claim 1, wherein the object to be collected is displayed in a form of a card, and the displaying, in the interactive window, the first object information of the object to be collected corresponding to the object determination operation in the interactive game comprises:

flipping a target card corresponding to the object determination operation in the interactive window, and displaying the first object information of the object to be collected corresponding to the target card in the interactive window.

6. The video interaction method according to claim 1, wherein the object to be collected is displayed in a form of a box, and the displaying, in the interactive window, the first object information of the object to be collected corresponding to the object determination operation in the interactive game comprises:

displaying an animation of opening a target box corresponding to the object determination operation in the interactive window, and displaying the first object information of the object to be collected corresponding to the target box in the interactive window in response to the animation being finished.

7. An electronic device, comprising:

at least one processor;

a memory for storing at least one program, which when executed by the at least one processor, causes the at least one processor to:

in response to a video of a target object being played to a first time node, display an interactive window at a preset position on a video playback page and continue playing the video, wherein an interactive game is displayed in the interactive window, and the target object is a target application;

receive an object determination operation acting in the interactive window, wherein the object determination operation comprises an interactive operation of a user in the interactive game;

display first object information of an object to be collected corresponding to the object determination operation in the interactive game in the interactive window, wherein the object to be collected is related to the target object;

receive a collection operation for the object to be collected;

send a target page display request to the target application, wherein the target page display request is used to request the target application to display a target page; and display the target page for a user to collect the object to be collected.

8. The electronic device according to claim 7, wherein the object to be collected is displayed in a form of a card, and the displaying, in the interactive window, the first object information of the object to be collected corresponding to the object determination operation in the interactive game comprises:

flipping a target card corresponding to the object determination operation in the interactive window, and displaying the first object information of the object to be collected corresponding to the target card in the interactive window.

9. The electronic device according to claim 7, wherein the object to be collected is displayed in a form of a box, and the displaying, in the interactive window, the first object information of the object to be collected corresponding to the object determination operation in the interactive game comprises:

displaying an animation of opening a target box corresponding to the object determination operation in the interactive window, and displaying the first object information of the object to be collected corresponding to the target box in the interactive window in response to the animation being finished.

10. A non-transitory computer-readable storage medium stored thereon a computer program, which when executed by a processor, causes the processor to:

in response to a video of a target object being played to a first time node, display an interactive window at a preset position on a video playback page and continue playing the video, wherein an interactive game is displayed in the interactive window, and the target object is a target application;

receive an object determination operation acting in the interactive window, wherein the object determination operation comprises an interactive operation of a user in the interactive game;

display first object information of an object to be collected corresponding to the object determination operation in the interactive game in the interactive window, wherein the object to be collected is related to the target object;

receive a collection operation in the interactive window for the object to be collected;

send a target page display request to the target application, wherein the target page display request is used to request the target application to display a target page; and display the target page for a user to collect the object to be collected.

11. The electronic device according to claim 10, wherein the at least one program when executed by the at least one processor, further causes the at least one processor to: before sending the target page display request to the target application:

download the target application and install the target application after a download is complete, in a case where the target application is not installed.

12. The electronic device according to claim 11, wherein the downloading the target application comprises:

downloading the target application and displaying a download progress of the target application in the interactive window; or switching from the video playback page to a details page of the target application, and downloading the target application in response to receiving a trigger operation on a first download control in the details page.

13. The electronic device according to claim 11, wherein the at least one program when executed by the at least one processor, further causes the at least one processor to:

in response to the video of the target object being played to a second time node, display second object information of the target object and a second download control on the video playback page, to download the target application in response to receiving a trigger operation on the second download control, wherein the second time node is earlier than the first time node.

14. The non-transitory computer-readable storage medium according to claim 10, wherein the computer program when executed by a processor, cause the processor to, before sending the target page display request to the target application:

download the target application and install the target application after a download is complete, in a case where the target application is not installed.

15. The non-transitory computer-readable storage medium according to claim 14, wherein the downloading the target application comprises:

downloading the target application and displaying a download progress of the target application in the interactive window; or switching from the video playback page to a details page of the target application, and downloading the target application in response to receiving a trigger operation on a first download control in the details page.

\* \* \* \* \*